Dec. 12, 1933.   B. F. BOWER ET AL   1,939,038
METAL WORKING APPARATUS
Filed April 2, 1930   4 Sheets-Sheet 1

Inventors
B. F. Bower
H. P. Mooy
By J. H. B. Whitfield Att'y.

Inventors
B. F. Bower
H. P. Mooy
By H. B. Whitfield Att'y.

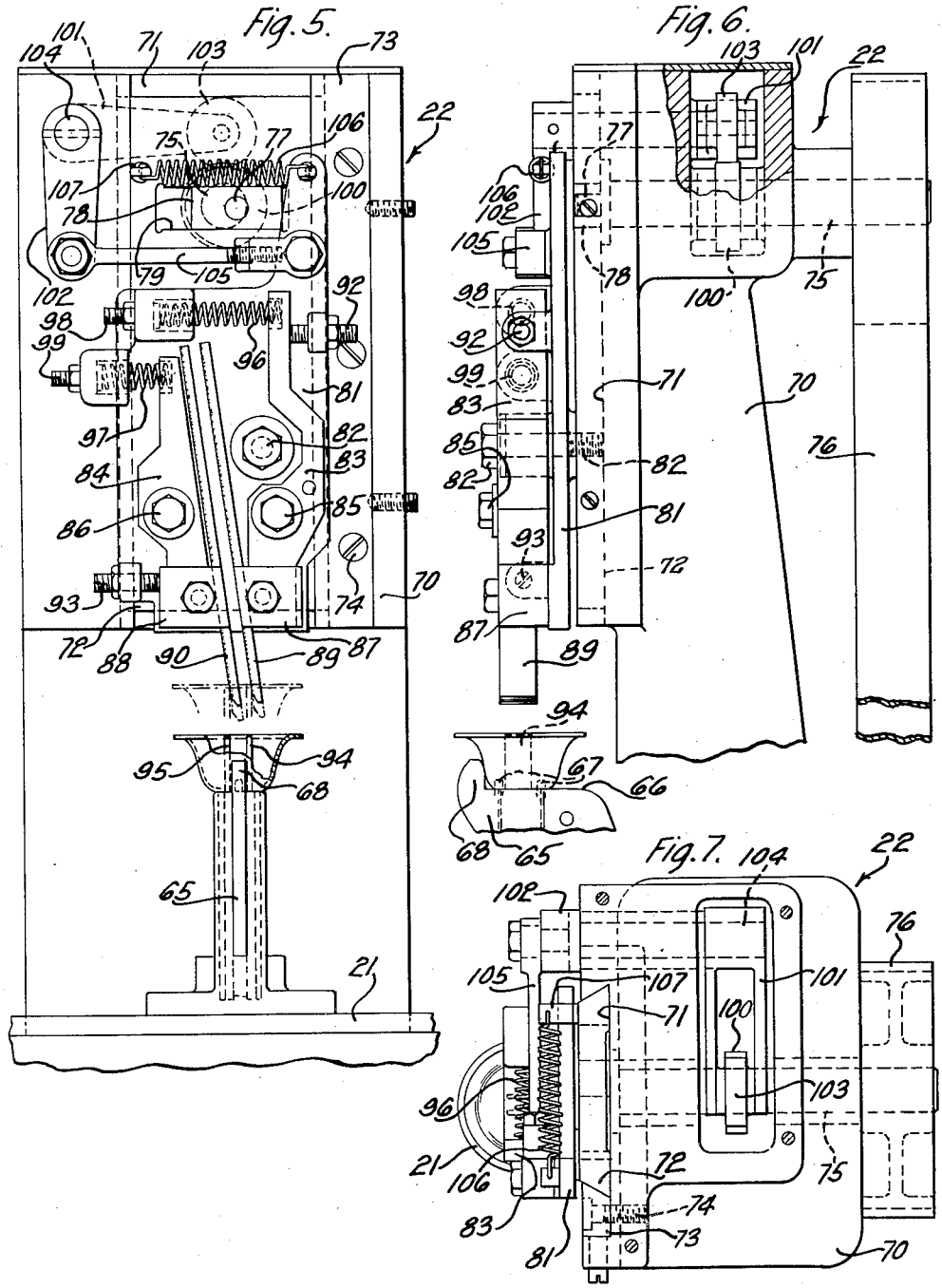

Dec. 12, 1933.  B. F. BOWER ET AL  1,939,038
METAL WORKING APPARATUS
Filed April 2, 1930   4 Sheets-Sheet 4
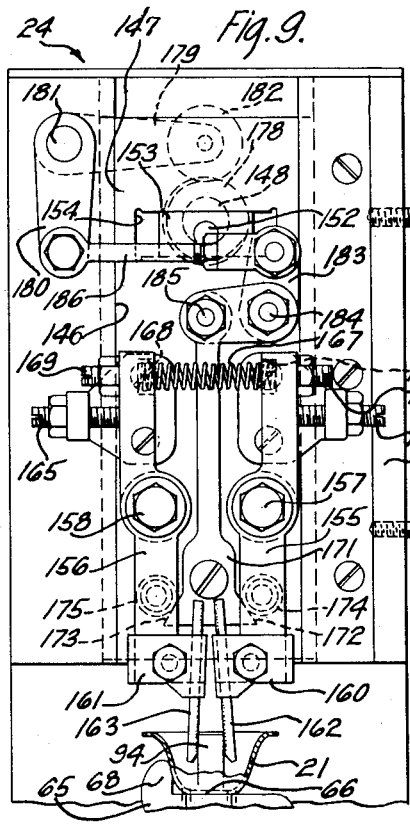
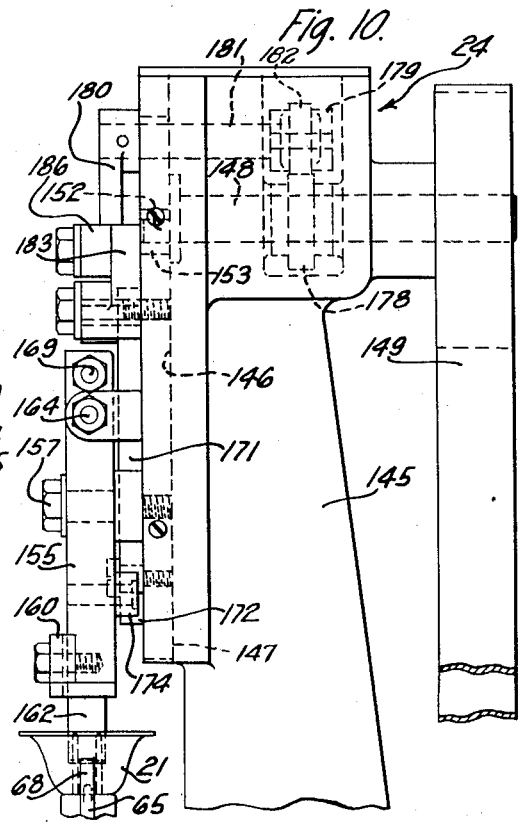
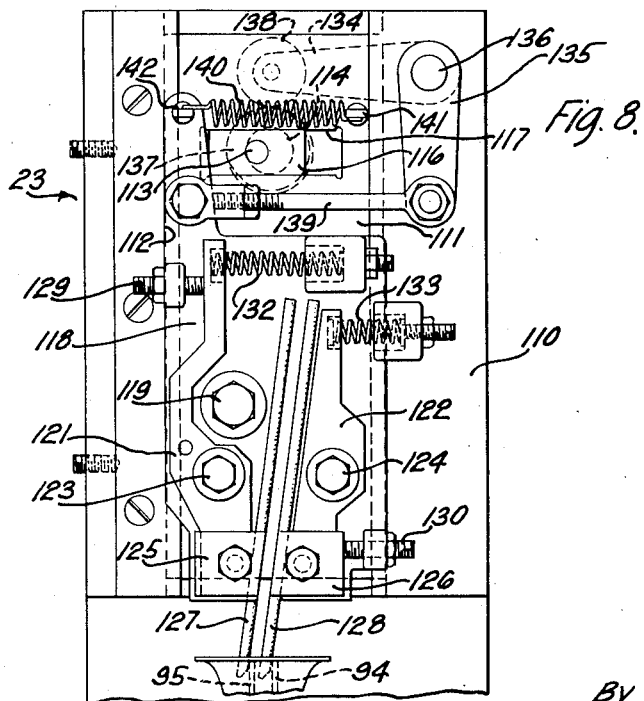
Inventors
B. F. Bower
H. P. Mooy
By H. B. Whitfield Att'y.

Patented Dec. 12, 1933

1,939,038

UNITED STATES PATENT OFFICE 1,939,038

METAL WORKING APPARATUS

Byron F. Bower, Western Springs, and Harold P. Mooy, Chicago, Ill., assignors to Western Electric Company, Incorporated, New York, N. Y., a corporation of New York Application April 2, 1930. Serial No. 440,916

9 Claims. (Cl. 29—76)

This invention relates to a metal working apparatus, and more particularly to an apparatus for filing burrs from electromagnetic pole pieces embodied in telephone receivers.

An object of this invention is the provision of a metal working apparatus which is simple in construction, durable, and efficient for processing metal parts.

In accordance with the general features of the invention, there is provided a filing machine especially designed for removing burrs from telephone receiver pole pieces, consisting of a rotating turret with fixtures to receive the parts to be filed and present them successively to different filing positions where mechanism is located having reciprocating file carriers with means for causing the files to disengage the part while being moved upwardly. Mechanism is also provided for stopping the apparatus, should the part not be inserted in the fixture properly, or should the operator fail to remove completely the part before the turret reaches a predetermined position.

Other objects of the invention will be apparent from the following detailed description when considered in connection with the accompanying drawings, wherein Fig. 1 is a top plan view of the apparatus;

Fig. 5 is a front elevational view of a first filing unit;

Fig. 6 is a side elevational view of the first filing unit;

Fig. 7 is a top plan view of the first filing unit;

Fig. 8 is a front elevational view of a second filing unit;

Fig. 9 is a front elevational view of a third filing unit, and

Fig. 10 is a side elevational view of the third filing unit.

Figure 4:
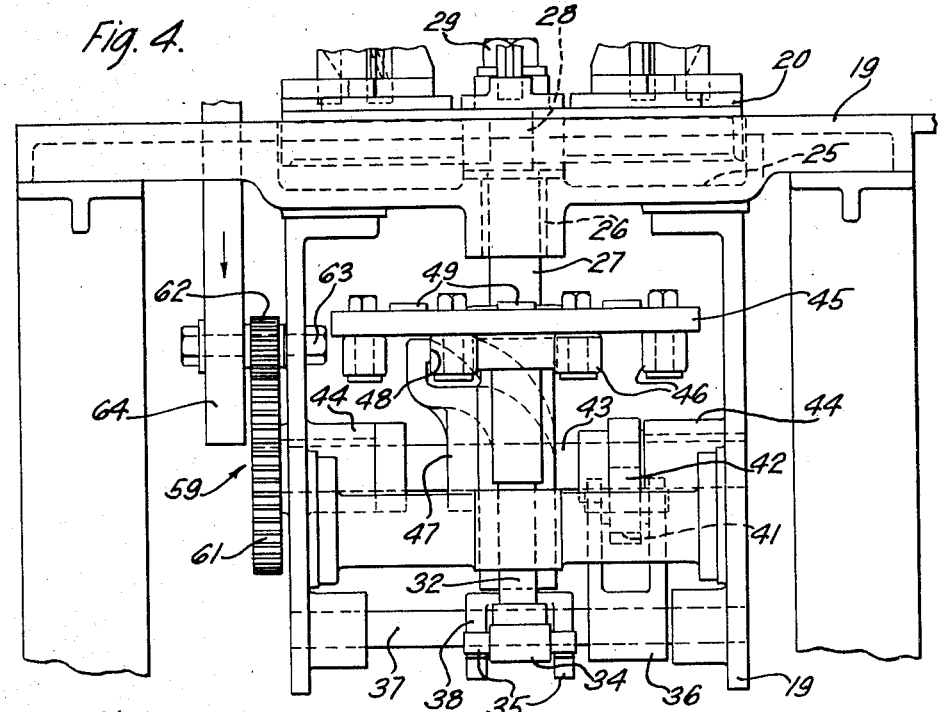
Fig. 4 is a front elevational view of the mechanism shown in Fig. 3.
Figure 3:
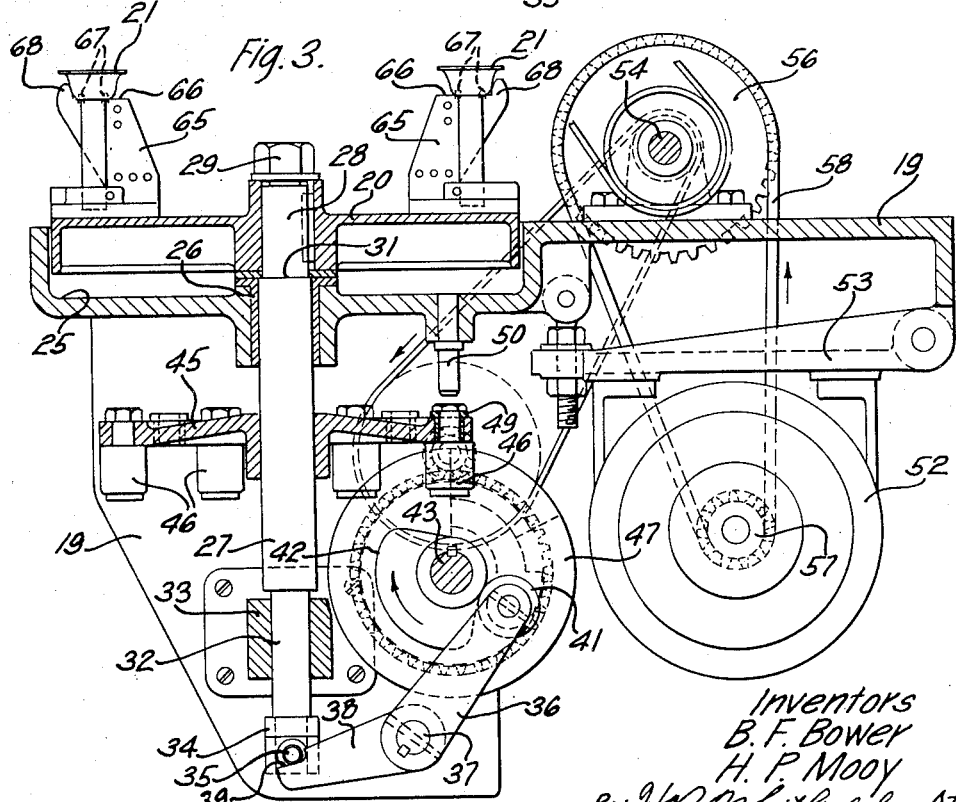
Fig. 3 is a side sectional view of the turret actuating mechanism taken substantially along the line 3—3 of Fig. 1.

Referring now to the drawings wherein like numerals have been employed to designate similar parts throughout the various figures, it will be observed that reference numeral 19 indicates a frame for rotatably supporting a turret 20 having brackets adapted to support receiver pole pieces 21 as will be hereinafter described, and move the articles or receiver pole pieces into operative engagement with filing units 22, 23, and 24, during an intermittent motion of the turret. The turret 20 is circular in general contour and is receivable in a depressed portion 25 (Fig. 4) in the frame 19. Centrally disposed in the depressed portion 25 is a bearing 26 adapted to receive a rotatable turret shaft 27 and serve as a bearing for the turret 20, which rests thereupon, and through the center of which extends a reduced portion 28 of the shaft 27. The turret 20 is keyed to the reduced portion 28 and is locked in place by a nut 29 so that it will rest upon a shoulder 31 (Fig. 3) provided by the reduced portion 28, when vertical movement is imparted thereto.

Vertical movement is imparted to the turret 20 by imparting a similar movement to the turret shaft 27. The lower end of the shaft 27 has a reduced portion 32 journalled in a bearing 33 and has rotatably mounted upon the lower end thereof a collar 34 which is provided with transversely extending lifting pins 35. A cam lever 36 is mounted upon a rocker shaft 37, which is carried by the frame 19, and which has a yoke 38 mounted thereupon, the fingers of which are adapted to engage with the pins 35 at 39 for the purpose of lifting the shaft 27 when the cam lever 36 is actuated. The opposite end of the cam lever 36 is provided with a cam roller 41 which is disposed in engagement with a cam 42, the latter being keyed to a shaft 43 which has its ends journalled in bearings 44 supported by the frame 19.

The mechanism for imparting an intermittent motion to the turret 20 consists of an intermittent moving roller wheel 45 (Figs. 3 and 4), disposed concentric with the shaft 27 and keyed thereto. Disposed at equally spaced positions adjacent the periphery of the wheel 45 are cam rollers 46 arranged to be engaged by a cam 47 which is mounted upon the shaft 43, and provided with an offset cam surface 48. Disposed at equally spaced positions adjacent the periphery of the wheel 45, are positioning bushings 49 arranged to receive a positioning pin 50 which is carried by the frame 19 for a purpose hereinafter described.

The power means for driving the turret actuating mechanism consists of a motor 52 which is adjustably carried by a motor support 53, the latter being carried by the frame 19. The motor 52 is operatively connected to a power shaft 54, which is journalled in bearings 55, upon the frame 19, by means of a sprocket 56 which is connected to a motor sprocket 57 by a chain 58. The shaft 43 is operatively connected to the shaft 54 through a reduction mechanism indicated generally at 59 (Fig. 4), which consists of a gear 61 mounted upon the shaft 43 and in mesh with a pinion 62 mounted upon stub shaft 63 which is carried by the frame 19. A pulley connection 64 operatively connects the pinion 62 with the power shaft 54.

A plurality of spaced article supporting brackets 65 (Figs. 1 and 3) are mounted upon the turret 20 and are provided with supporting surfaces 66, having spaced retaining pins 67 thereabove. Holding lugs 68 are integral with the brackets 65 and are adapted to cooperate with the pins 67 to hold the articles against displacement. As will be observed by viewing Fig. 1, the units 22, 23, and 24 are so positioned in arcuate arrangement that three adjacent articles or receiver pole pieces may be operated upon simultaneously. The unit 22 as shown in Figs. 5, 6, and 7 consists of a housing 70, having a relatively large dovetail slot 71 in the forward surface thereof arranged to receive a dovetail reciprocating plate 72. One side of the dovetail slot 71 is formed by a removable strip 73 which is held in place by any suitable means such as machine screws 74. A reciprocatory movement is imparted to the plate 72 by the rotation of an eccentric shaft 75 which is journalled in the housing 70 and operatively connected to the power shaft 54 by a belt connection 76. The forward end of the shaft 75 is provided with an eccentric pin 77 rotatably disposed in a slide plate 78 which is slidably disposed in an elongated aperture 79 in the plate 72. A rocking or oscillatory plate 81 is pivotally mounted at 82 upon the reciprocating plate 72, and has file supporting rocker arms 83 and 84 pivotally mounted thereupon at points 85 and 86, respectively. The arms 83 and 84 are provided with clamps 87 and 88, respectively, arranged to respectively receive files 89 and 90 and firmly hold the files in desired positions relative to the plate 81. Adjustable stop members 92 and 93 are carried by the housing 70 and arranged to limit the movement of the files 89 and 90 toward the pole pieces 94 and 95 of the article. Resilient members such as springs 96 and 97 are carried by the housing 70 and have their outer ends in engagement with the arms 83 and 84, respectively, so as to normally hold the arms in engagement with their respective stop members 92 and 93. The resiliency of the spring 96 and 97 may be varied by the adjusting means indicated at 98 and 99, respectively.

The mechanism for imparting the rocking or oscillatory movement to the plate 81 consists of a cam 100 which is mounted upon the shaft 75 and arranged to actuate rocking levers 101 and 102 due to the engagement of the cam with a cam roller 103 which is carried by the lever 101. The rocking levers 101 and 102 are fixedly mounted upon a shaft 104 which is rotatably mounted in the housing 70, the lever 102 being operatively connected to the upper portion of the rocking plate 81 by means of a connecting link 105. The cam roller 103 is constantly held in engagement with the cam 100 by a spring 106, one end of which is connected to the upper end of the plate 81 and the other end of which is fixed to the reciprocating plate 72 at 107.

Figure 1:
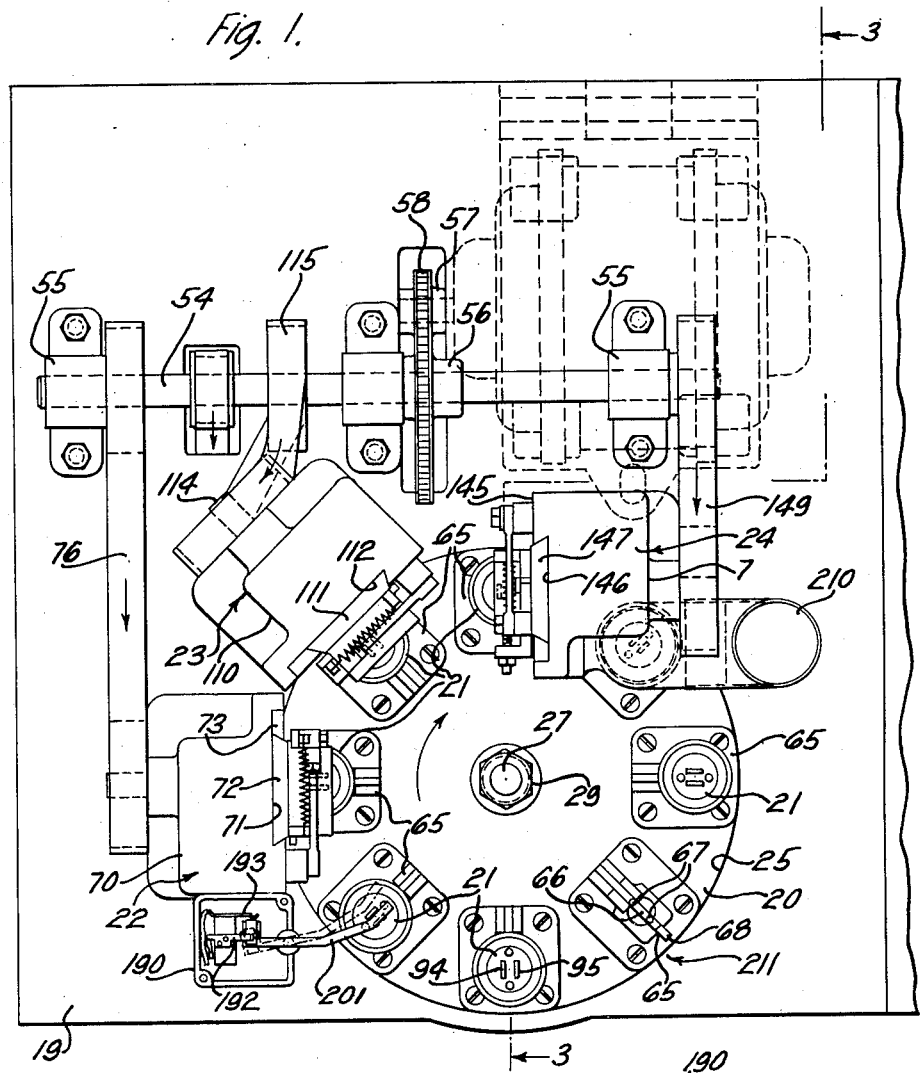

The second unit 23 (Figs. 1 and 8), is substantially identical to the first unit 22 with the exception that the first unit may be termed as a right hand filing unit, and the unit 23 may be termed as a left hand filing unit. This second unit is also provided with a housing 110 having a reciprocating plate 111 of a dovetailed cross-sectional contour slidably disposed in a dovetail slot 112 of the housing. The reciprocatory movement of the plate 111 is imparted thereto by means of an eccentric 113 of a shaft 114, which is operatively connected to the power shaft 54 through a belt connection 115 (Fig. 1). The eccentric 113 is rotatably receivable in a slide plate 116 which is slidably disposed in an elongated aperture 117 of the plate 111. A rocking or oscillatory plate 118 is pivotally mounted at 119 upon the reciprocating plate 111 and has file supporting arms 121 and 122 pivotally mounted thereupon at 123 and 124, respectively, and provided with clamps 125 and 126 at their lower ends arranged to receive and firmly hold filing tools 127 and 128, respectively. Adjustable stop members 129 and 130 are carried by the rocking plate 118 for the purpose of varying the movement of the filing tools 127 and 128 in one direction. Adjustable resilient members 132 and 133 are provided to normally hold the arms 121 and 122 in their work engaging positions adjacent the stop members 129 and 130.

A rocking or oscillatory movement of the rocker plate 118 is imparted thereto by movement of levers 134 and 135, which are fixedly mounted upon a shaft 136 rotatably disposed in the housing 110. The lever 134 is operatively connected to a cam 137 on the shaft 114 through a cam roller 138 and the lever 135 is operatively connected to the rocking plate 118 by means of a connecting rod 139. A spring 140 has one end connected to the reciprocating plate 111 at 141 and the other end connected to the rocking plate 118 at 142 for the purpose of holding the cam roller 138 in engagement with the cam 137.

The unit 24 (Figs. 1, 9, and 10) consists of a housing 145, which is mounted upon the frame 19 and provided with a relatively wide vertically extending dovetail slot 146 arranged to slidably receive a dovetail reciprocating plate 147. Reciprocatory movement is imparted to the plate 147 by rotation of a shaft 148 rotatably disposed in the housing 145 and having one end operatively connected to the power shaft 54 through a belt and pulley 149, while the other end of the shaft 148 is provided with an eccentric 152 operatively connected to a slide plate 153 which is slidably disposed in an elongated aperture 154 of the reciprocating plate 147.

Tool supporting arms 155 and 156 are pivotally mounted at 157 and 158, respectively, upon the reciprocating plate 147 and have, at their lower ends, tool receiving clamps 160 and 161 which are arranged to receive and firmly hold filing tools 162 and 163, respectively. Adjustable stop members 164 and 165 are carried by the housing 145 for the purpose of limiting the movement of the tool supporting arms 155 and 156. A spring 167 is disposed between the upper ends of the arms 155 and 156 and has its ends embedded in recesses 168 which are disposed in the arms. Adjustable members 169 are carried by each of the arms 155 and 156 for the purpose of varying the tension of the spring 167. A means is provided for moving the lower ends of the arms 155 and 156 outwardly about their pivots during the upward movement of the reciprocating plate 147, and its cooperating parts and this means consists of a cam arm 171 having outwardly extending cam surfaces 172 and 173 at the lower end thereof, which are arranged to engage the cam rollers 174 and 175, respectively, which are carried by the arms 155 and 156. The cam arm 171 is actuated by its operative connection with the cam 178 which is adapted to actuate levers 179 and 180 with their pivot shaft 181 through the connection of a cam roller 182 which is carried by the lever 179. The lever 180 is operatively connected to a bell crank lever 183, which is pivotally mounted at 184 upon the reciprocating plate 147 and operatively connected to the cam arm 171 at 185, by means of a connecting rod 186.

Figure 2:
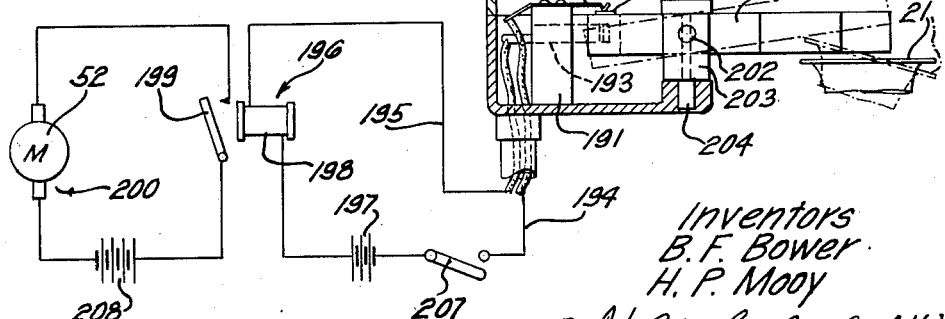
Fig. 2 is a detailed view of the automatic switch.

In Figs. 1 and 2 the automatic switch mechanism is shown for breaking the circuit to the motor 52 when an article has not been placed properly upon the turret. This mechanism consists of a housing 190 having an insulating contact support 191 disposed therein and provided with contact members 192, and 193 which are connected to conductors 194 and 195, respectively, of a relay circuit indicated generally at 196. A source of current, such as a battery 197, is provided for the circuit 196, so as to energize a relay 198 for actuating a switch 199 of a motor circuit 200 when the relay circuit is closed. A switch lever 201 is movably disposed upon a horizontal pivot 202 of a swivel block 203, which has a vertically extending pivotal connection 204 in the housing 190. The outer end of the switch lever 201 is formed so that it will be in close proximity to the upper extremity of each of the articles mounted upon the brackets 65 and in radial alignment with the center line of the turret 20. The inner end of the switch lever 201 is provided with a contact block 206 which extends over the top and side of the lever and is insulated therefrom.

From the foregoing description of the various parts of the device, the operation thereof will be more clearly understood. Let it be assumed that a main switch 207 of the relay circuit is closed and that the switch lever 201 is in its normal position; that is, in a position whereby the contact block 206 is disposed in engagement with the contact members 192 and 193, thus energizing the relay 198, through the battery 197, and closing the switch 199. When the switch 199 is closed, the motor 52 will be energized by a source of current such as a battery 208.

As the motor is energized, the power shaft 54 will be rotated, thus actuating the units 22, 23, and 24. During the actuation of the unit 22, the filing members 89 and 90 are held in their normal positions so that when the article is moved to the dotted line position (Fig. 5), the file members will engage with the upper right edges of the pole pieces 94 and 95 during their downward movement. Upon the completion of the downward movement of the file members 89 and 90, and before the upward movement thereof has begun, the rocking or oscillatory plate 81 will be swung about its pivot 82 due to the tension of the spring 106 which was tensioned during the downward movement of the file members through the actuation of the levers 101 and 102 by the cam 100, thus moving the file members 89 and 90 free of the pole pieces 94 and 95 while the file members are being moved upwardly, during the upward movement of the reciprocating plate 81, through the movement of the eccentric 77. This reciprocatory movement is imparted to the file members 89 and 90 so as to move the file members downwardly, while they are held in engagement with the pole pieces 94 and 95 by the springs 96 and 97, and to move the file members upwardly after they have been moved laterally free of the pole pieces. This upward movement of the article 21 is effected by the actuation of the cam lever 36 and the yoke 38 by the cam 42, thus bringing about an upward movement of the shaft 27 and in turn moving the turret 20, the brackets 65, and the articles 21 upwardly. While the shaft 27 is disposed in this upward position, the positioning pin 50 is received in the adjacent bushing 49, thus holding the shaft 27 and the turret 20 against rotation so as to properly position the article 21 relative to the units 22, 23, and 24.

After the article has been disposed in operative engagement with the unit 22 a predetermined length of time, the turret 20 is lowered into its normal position in the depressed portion 25, as the roller 41 of the cam lever 36 rides upon the lowering surface of the cam 42, thus allowing the shaft 27 to move downwardly.

An intermittent rotary motion is imparted to the turret for moving the article, which has just been moved away from the unit 22, into general alignment with the filing members 127 and 128 of the unit 23. This intermittent motion is imparted to the turret when the cam 47 engages with the next adjacent roller 46, thus rotating the shaft 27 together with the turret 20 in a clockwise direction so as to position articles, supported by the brackets 65, beneath the units 22, 23, and 24. In this manner a new article will receive the filing operation from the first unit after the turret has been raised as heretofore described, and the article which has previously received the filing operation from the first unit 22 will receive a second filing operation from the unit 23.

The second operation by the unit 23 is substantially identical to that operation submitted by unit 22, with the exception that the opposite or upper left edges of the pole pieces 94 and 95 will be filed so as to remove the burrs therefrom. This filing takes place during the reciprocatory movement of the file members 127 and 128 during the similar movement of the reciprocating plate 111 which is effected by the actuation of the eccentric 113. During this reciprocatory movement of the file members 127 and 128, the rocking or oscillatory plate 118 is moved about its pivot 124, while the file members 127 and 128 are in their lowermost positions so as to move the file members away from the pole pieces 94 and 95 and hold the file members in their outward position during the upward movement thereof. The rocking of the plate 118 about its pivot 124 to engage the file members 127 and 128 with the pole pieces 94 and 95 is effected by the actuation of the bell crank lever 134 due to its operative engagement with the cam 136, and an outward movement of the file members is effected by the spring 140 in a manner similar to that described in connection with the unit 22. It will, therefore, be understood that the file members 127 and 128 are held in engagement with the pole pieces 94 and 95 by means of the springs 132 and 133, respectively, during the downward movement of the reciprocating plate 111 and that the file members are moved away from the pole pieces at the lower end of the downward movement and held away from the pole pieces during the upward movement thereof.

The turret, together with the articles disposed thereupon, is again lowered and moved in a clockwise direction so as to position a new article beneath the unit 22, position the article which has received the first operation beneath the unit 23, and position the article which has received the first and second operations beneath the unit 24.

The turret 20 is again raised to the operating position allowing the first and second operations to take place upon the articles moved into engagement with the units 22 and 23 as heretofore described, and allowing the unit 24 to perform the third operation upon the article disposed in registration therewith (Figs. 9 and 10). While the article is in this upward position, the file members 162 and 163 are moved into engagement with the upper end edges of the pole pieces 94 and 95, during the downward movement of the reciprocating plate 147. At the lowermost position of the file members 162 and 163, the cam arm 171 is moved upwardly due to its operative engagement with the cam 178, thus moving the arms 155 and 156 outwardly about their pivots 157 and 158, moving the file members 162 and 163 away from the pole pieces and retaining this position during the upward movement of the file members which is effected by the upward movement of the reciprocating plate 147 due to the actuation of the eccentric 152. During the downward movement of the reciprocating plate 147, the arms 155 and 156 are released by the cam arm 171 and allowed to be swung about their pivots by the spring 167 so as to allow the file members 162 and 163 to engage with the pole pieces during the downward movement thereof.

The actuation of the units 22, 23, and 24 is continuous, allowing the file members thereof to be moved into engagement with the pole pieces of the adjacent articles a predetermined number of times while in the upward position. The resiliency of the file supporting arms of these units makes it possible for the articles to be moved into operative engagement with the units at any predetermined time during the operation of the units. After the articles receive the operation from the unit 24, they are moved into engagement with a suction tube 210 (Fig. 1), which is operatively connected to an air line (not shown) for the purpose of removing the filings from the magnet cup of the article. The finished article is removed from the turret at the position indicated generally at 211 and a new article is disposed thereupon allowing the pins 67 of the bracket 65 to extend through the openings in the article. If the article is placed upon the bracket properly, it will pass beneath the switch lever 201 and receive the various operations thereupon. For the purpose of illustration, let it be assumed that the article has not been disposed upon the bracket properly (Figs. 1 and 2). When the improperly positioned article reaches the switch lever 201, the switch lever will either be swung upwardly about the pivot 202 as shown in Fig. 2 so as to move the contact block 206 away from the contact member 192 and break the circuit to the relay 198, or swing the switch lever 201 about the pivot 204 and move the contact block 206 away from the contact member 193, thus breaking the circuit to the relay. The switch lever 201, if moved either vertically or laterally, will break the relay circuit, causing the switch 199 of the motor circuit 200 to open, and due to the close positioning of the switch lever relative to the articles upon the turret (Fig. 2) any displacement of the articles upon the brackets 65 will actuate the switch lever 201.

Although the invention as herein described and illustrated is particularly well adapted for filing burrs from receiver pole pieces, it will be understood that the invention is capable of any other modifications and applications without departing from the spirit and scope of the invention.

What is claimed is:

1. In a filing apparatus, means for receiving an article whereby the article may be held in a predetermined position, means for actuating said article receiving means for imparting movement to the article, and means for stopping the actuation of said article receiving means when the article is out of the predetermined position upon said article receiving means.

2. In a filing apparatus, a filing unit, power means for actuating said filing unit, means for receiving an article, means for operatively connecting said article receiving means to said power means, said article receiving means including a bracket for holding the article in a predetermined position, and means for automatically stopping the actuation of said power means, said unit and said article receiving means when said article is out of the predetermined position upon said bracket.

3. In a filing apparatus, a tool, pivotal means for holding said tool, means for imparting a reciprocatory movement to said tool and said pivotal tool holding means, a shaft, means for rotating said shaft, a cam mounted upon said shaft, and means for operatively connecting said pivotal tool holding means with said cam whereby said tool holding means may be actuated when said shaft is rotated for imparting an oscillatory movement to said tool transversely relative to the reciprocatory movement of said tool holding means.

4. In a filing apparatus, a file, means for holding said file, means for pivotally supporting said file holding means, means for imparting a reciprocatory movement to said file, means for moving an article to be filed toward said file whereby said file may engage said article during the movement thereof in one direction, and cam actuated means for moving said file holding means on said pivotal supporting means for moving the file free of the article during the movement of the file in the opposite direction.

5. In a filing apparatus, a reciprocable member, a file, means for holding said file, means for pivotally securing said file holding means to said reciprocable member, a rotatable shaft, means carried by said shaft for imparting a reciprocatory movement to said reciprocable member when said shaft is rotated, means for moving an article toward said file whereby said file may engage the article during one movement of said file with said reciprocable member, a cam disposed upon said shaft, and means disposed in operative engagement with said cam for moving said file holding means about said pivotal supporting means for moving said file free of the article during the movement of said file and said reciprocable member in the opposite direction.

6. In a filing apparatus, a reciprocable member, means for movably receiving said reciprocable member, a shaft, an eccentric carried by said shaft, means for operatively connecting said eccentric to said reciprocable member whereby a reciprocatory movement may be imparted to said reciprocable member during the actuation of said eccentric, a file, an oscillatory member carried by said reciprocable member for supporting said file, means for holding said oscillatory member and thereby said file in normal position relative to said reciprocable member, means for moving an article toward said file whereby said file may be moved into engagement with the article during the movement of said oscillatory member, said file and said reciprocable member in one direction, a cam carried by said shaft, and means disposed in operative relation with said cam for moving said oscillatory member and thereby said file out of its normal position and away from said article during the movement of said file said oscillatory member and said reciprocable member in the opposite direction.

7. In a filing apparatus, a shaft, a reciprocable member, means for operatively connecting said reciprocable member to said shaft whereby a reciprocatory movement will be imparted to said reciprocable member by the rotation of said shaft, a pivotal tool holding member carried by said reciprocable member, a tool for said tool holding member, and means for operatively connecting said tool holding member to said shaft whereby said tool holding member may be actuated for imparting an oscillatory movement to said tool when said shaft is rotated.

8. In a filing apparatus, a reciprocable member, a pivotal member carried thereby, a file pivotally mounted upon said pivotal member, stop means associated with the file for limiting the pivotal movement thereof in one direction, and a resilient element associated with the file for normally holding the same in association with its limiting stop means.

9. In a metal working apparatus, a movable article advancing member having means for supporting an article in a predetermined position, means for moving the member and thereby the article, and means actuated by the article when it is not in the predetermined position for discontinuing the movement of the member.

BYRON F. BOWER.
HAROLD P. MOOY.